(No Model.)
F. B. ASPINALL.
PROCESS OF REFINING COTTON SEED OIL.
No. 557,098. Patented Mar. 31, 1896.
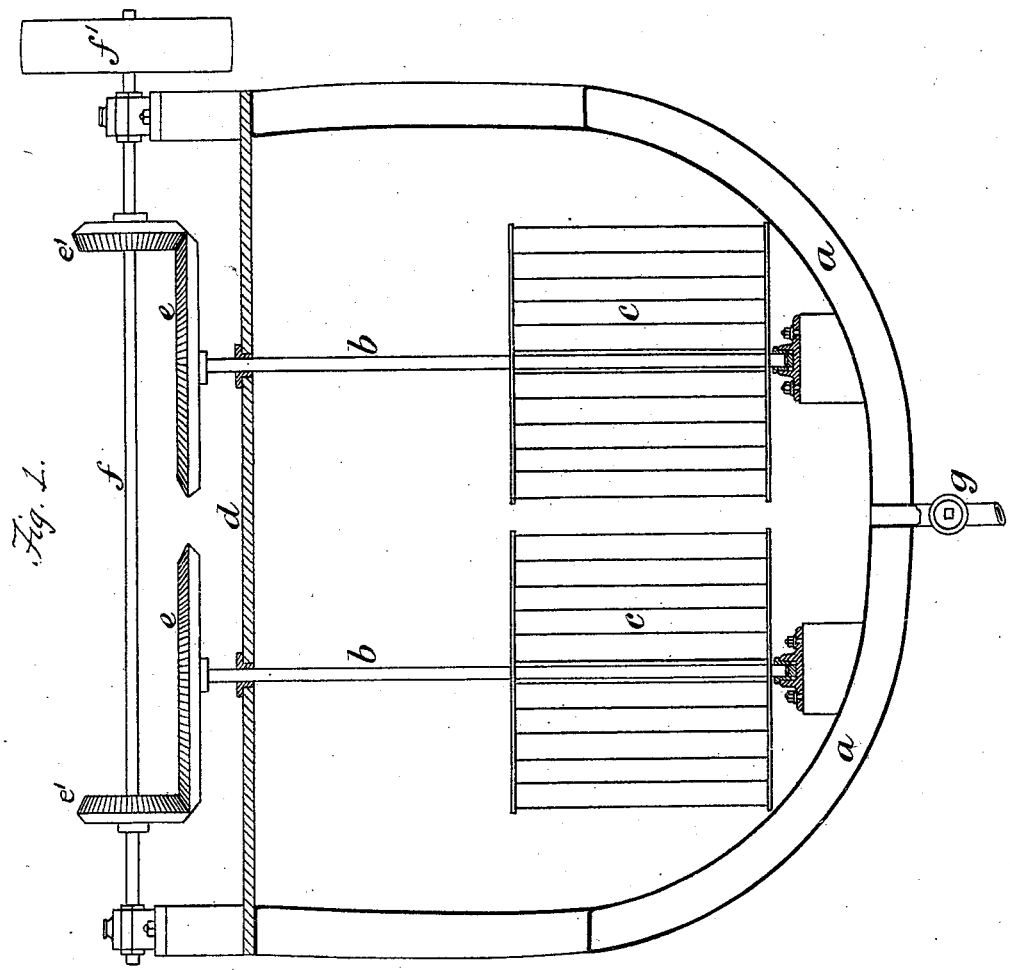
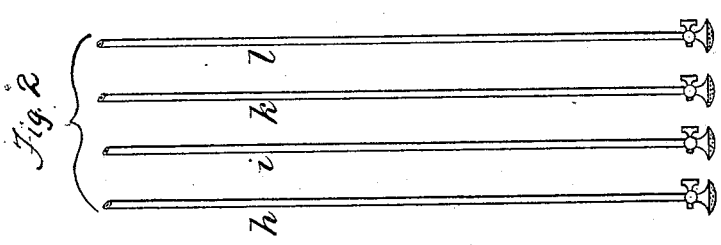
Witnesses
Guy E. Davis
B. W. Miller
Inventor
Frank B. Aspinall
By his Attorneys
Baldwin Davidson & ...

UNITED STATES PATENT OFFICE.

FRANK BOULTON ASPINALL, OF LONDON, ENGLAND.

PROCESS OF REFINING COTTON-SEED OIL.

SPECIFICATION forming part of Letters Patent No. 557,098, dated March 31, 1896.

Application filed January 9, 1895. Serial No. 534,362. (No specimens.)

*To all whom it may concern:*

Be it known that I, FRANK BOULTON ASPINALL, electrical engineer, a subject of the Queen of Great Britain, residing at No. 13 Blessington Road, Lee, London, England, have invented certain new and useful Improvements in the Treatment of Cotton-Seed Oil, of which the following is a specification.

This invention has for its object improvements in the treatment of cotton-seed oil.

In the practice of my invention I employ an apparatus comprising a tank able to hold double the quantity of oil to be refined. It is fitted with paddles to give good mechanical agitation. Salt water and caustic lye are supplied to the tank in suitable ways, preferably from tanks above the level of the tank first referred to. Hot and cold water are supplied to the main tank through suitable pipes, and the tank is steam-jacketed, so that the contents may be heated when required.

In the accompanying drawings, Figure 1 shows a vertical section of the tank in which the cotton-seed oil is treated. Fig. 2 shows the pipes through which cold water, hot water, salt water, and caustic lye are introduced.

$a$ is a steam-jacket enveloping the lower part of the tank. $b\ b$ are two vertical shafts carrying beaters or agitators $c\ c$. The lower ends of the shafts are stepped into suitable bearings within the tank, and the shafts have upper bearings fixed in a strong bar $d$, which extends across the tank from side to side.

$e\ e$ are beveled wheels on the shafts $b\ b$. They engage with and are driven in opposite directions by beveled wheels $e'\ e'$ upon a driving-shaft $f$, to which is secured a belt-pulley $f'$. At the bottom of the tank is a draw-off cock $g$.

$h\ i\ k\ l$ indicate four flexible pipes, each furnished with a rose and a stop-cock. These pipes are used for supplying cold water, hot water, salt water and caustic lye to the tank. I have shown the pipes removed from the tank. They can be readily inserted and removed when required.

The crude oil which is to be treated is put into the tank at a temperature of about 80° Fahrenheit. The agitator is then started and a solution of common salt in water, density about 10° Twaddell, is added. About eighty gallons to a ton is used and the salt water is thoroughly well mixed with the oil, care being taken to continue the agitation only long enough to obtain a thorough mixture. Caustic soda-lye is then added, the agitation still continuing. The caustic should be of a density about 22° Twaddell and its temperature about 80° Fahrenheit. Care must be taken to put only sufficient caustic alkali to thoroughly "break" the oil.

The appearance of the oil is a sufficient guide to the operator. A sample spread on a plate should look clear, although full of minute dark spots. This test is well known to oil-refiners.

On one hundred tons of oil done by this process thirty-six hundredweight of salt made into a solution with water of a strength of 10° Twaddell and twelve hundredweight of caustic soda made into a solution of 22° Twaddell with water will be about what is necessary; but different oils require different strengths and quantities of salt and soda. For instance, Egyptian oil would require different quantities from American oil; also, oil from new Egyptian seed would require different quantities from oil from old Egyptian seed, and the same with American oil. This is easy to determine, however, by trial on a small quantity.

Directly the oil is broken the agitation should be stopped at once and warm water—say about 140° Fahrenheit—thoroughly sprinkled over the oil. In some cases cold water may be used. The clean oil will then come to the top and the coloring-matter go into the water and subside with it.

Plenty of water must be used until all clots in the oil have disappeared, are thoroughly dissolved, and any oil at first carried down in mechanical mixture with coloring-matter has separated and risen to the surface.

Different oils may require to be treated with different strengths and quantities of caustic soda and salt solution, but this is readily ascertained by trial.

I prefer to treat the oil when warm. The oil after treatment and when thoroughly washed can be separated from water in mechanical mixture by heating to, say, 160° Fahrenheit. When this process is properly worked, practically no saponification of the oil takes place. No mucilage is formed.

Finally, the oil may be brightened by ordinary means, and is then ready for the market as sweet-oil; or, if it is required for bleached oil, it is bleached by ordinary means. The above process is applicable to either cold-drawn or hot-drawn oil. The process can be carried out in one tank.

What I claim is—

The process herein described for refining cotton-seed oil, which consists in first agitating and mixing it with a solution of common salt, and then, while it is so agitated and mixed, treating it with caustic lye, and afterward washing with water.

FRANK BOULTON ASPINALL.

Witnesses:
FREDERICK CARPMALL,
JOHN H. WHITEHEAD.